United States Patent
Andrews et al.

(10) Patent No.: US 6,464,854 B2
(45) Date of Patent: Oct. 15, 2002

(54) WATER SOURCES FOR AUTOMOTIVE ELECTROLYZERS

(75) Inventors: Craig C. Andrews, College Station, TX (US); A. John Appleby, Bryan, TX (US); Alan J. Cisar, Cypress, TX (US); Carlos Salinas, Bryan, TX (US); Oliver J. Murphy, Bryan, TX (US)

(73) Assignees: Lynntech, Inc., College Station, TX (US); The Texas A&M University System, College Station, TX (US)

( * ) Notice: Subject to any disclaimer, the term of this patent is extended or adjusted under 35 U.S.C. 154(b) by 0 days.

(21) Appl. No.: 09/494,679

(22) Filed: Jan. 31, 2000

(65) Prior Publication Data

US 2002/0070124 A1 Jun. 13, 2002

Related U.S. Application Data

(63) Continuation-in-part of application No. 08/991,085, filed on Dec. 16, 1997, now abandoned.

(51) Int. Cl.$^7$ .................. C25C 1/02; B01D 17/06; B01D 47/00
(52) U.S. Cl. .................. 205/628; 205/763; 423/212
(58) Field of Search ............... 205/628, 637, 205/763; 423/212; 60/272

(56) References Cited

U.S. PATENT DOCUMENTS

| 5,658,449 A | * | 8/1997 | Benz et al. ............ 205/637 |
| 5,678,403 A | | 10/1997 | Kanehara et al. ......... 60/309 |
| 5,813,222 A | * | 9/1998 | Appleby ............... 60/274 |
| 5,964,089 A | * | 10/1999 | Murphy et al. .......... 60/286 |
| 6,122,909 A | * | 9/2000 | Murphy et al. .......... 60/286 |
| 6,235,254 B1 | * | 5/2001 | Murphy et al. ......... 423/210 |

* cited by examiner

Primary Examiner—Nam Nguyen
Assistant Examiner—Erica Smith-Hicks
(74) Attorney, Agent, or Firm—Streets & Steele; Jeffrey L. Streets

(57) ABSTRACT

The present invention provides a self-replenishing liquid water source onboard an automobile for supplying liquid water to an electrolyzer, such as an on-board hydrogen generator useful for the suppression of unwanted emissions. While automobiles typically have water reservoirs resupplied by a person, the invention provides a passive means of water collection for reliable replenishment due to operations of the automobile itself. The invention provides condensate from the engine exhaust gas by cooling a region of the exhaust system using cooling fluid from the engine coolant system. The cooling fluid is circulated during a period following the engine cold start event when the heat load on the engine coolant system is low.

26 Claims, 10 Drawing Sheets

WATER SOURCES FOR AUTOMOTIVE ELECTROLYZERS

This is a continuation-in-part application of application Ser. No. 08/991,085 filed on Dec. 16, 1997 abandoned.

BACKGROUND OF THE INVENTION

1. Field of the Invention

The present invention relates to a method of providing water for use on-board an automobile. More particularly, the present invention relates to operating an electrolyzer on-board an automobile.

2. Background of the Related Art

Catalytic converters are commonly used to reduce unwanted emissions through catalytic combination of the emissions with oxygen from the air. Catalytic combination, often referred to as catalytic combustion, is a flameless process in which mixtures of emissions (or fuel) and air (or oxygen) are passed over a catalyst at a temperature high enough to favor total oxidation of the emissions (or of the fuel). The reaction occurs at the catalyst surface resulting in liberation of energy and production of reaction products. For organic fuels, the reaction products are primarily carbon dioxide and water.

The control and suppression of unwanted emissions created by the operation of an internal combustion engine is a primary consideration for engine designers and vehicle manufacturers because of nearly world-wide governmental requirements regarding acceptable emission levels. Over eighty percent (80%) of the unacceptable emissions or pollutants created by internal combustion engines equipped with catalytic converters occur during cold start operations. These pollutants are emitted for a period of one to three minutes after cold engine starting, in large part because that is the time period required for the catalyst to reach an efficient operating temperature. Therefore, even though the engine exhaust is flowing through the catalytic converter, until the exhaust heats the catalytic converter to its operating range from engine start up, the engine emissions are only slightly catalytically decomposed during that time period.

In order to meet governmental emission standards for internal combustion engine exhaust, a catalytic converter is located in the exhaust stream of the engine. The converter typically includes a canister holding a suitable catalyst, such as a three-way catalytic converter (TWC) catalyst monolith, that will oxygenate unburned, unacceptable components in the exhaust stream including hydrocarbons (HC), their partially oxidized derivatives such as aldehydes and carbon monoxide (CO), and at the same time reduce nitrogen oxides ($NO_x$), after almost stoichiometric fuel bum with oxygen in the cylinders of the engine. The exhaust gas is passed through the catalyst monolith, thereby completing the oxygenation of unburned HC and CO, and the reduction of $NO_x$ in the exhaust to convert these unacceptable emissions into acceptable emissions. Certain unacceptable emissions in the exhaust stream, including unburned hydrocarbons and carbon monoxide, require an oxidation reaction to destroy them so that they end up as the corresponding oxides, e.g., water and carbon dioxide. On the other hand, $NO_x$ requires a reduction reaction to develop $N_2$ and $O_2$. In fact, the $O_2$ product of this reduction contributes to the oxidation of the HC and CO in the exhaust.

Catalytic converters are typically manufactured by coating a substrate, such as a metal or ceramic material, with a high surface area material, typically a metal oxide media. The catalytic material, such as a noble metal, is then deposited on the high surface area material. In the formation of such a catalytic converter, a sintered, dense and hardened ceramic substrate for example, which can be in the shape of a honeycomb, wagon-wheel, spiral or other molded or shaped objects, or simply be in the form of pellets, is coated with a slurry of the high surface area material, after which the catalyst is applied to the slurry-coated substrate, typically by application of a solution of a salt of that metal.

More particularly, the underlying ceramic substrate can be cordierite, mullite, alumina, lithium aluminosilicates, titania, zircon, feldspar, quartz, fused silica, clays, kaolin clay, aluminum titanate solid solutions, silicates, zirconia, spinels, glasses, glass ceramics, aluminates, and mixture thereof. The constituent ceramic materials are generally admixed with binders or shaping agents, processed, molded where applicable, and sintered. Coating of the substrate with the high surface area media can be effected either by immersion or dipping, followed by heat-treating the coated substrate at a temperature between 500° C. and 600° C. Procedures for depositing a high surface area "wash-coat" on the previously sintered ceramic substrate are disclosed, for example, in U.S. Pat. No. 3,824,196. Following application of the slurry of high surface area material, the catalyst is applied in the manner stated above. Alternatively, a single "wash-coat" mixture of the high surface area media and the catalytic material can be applied together.

TWC catalysts are currently formulated and designed to be effective over a specific operating range of both lean and rich fuel/air conditions and a specific operating temperature range. These particular catalyst compositions enable optimization of the conversion of HC, CO, and $NO_x$. This purification of the exhaust stream by the catalytic converter is dependent on the temperature of the exhaust gas and the catalytic converter works optimally at an elevated temperature, generally at or above about 300° C. "Light-off temperature" is generally defined as the temperature at which fifty percent (50%) of the emissions from the engine are being converted as they pass through the catalyst. The time period between "cold start" and reaching the light off temperature is generally referred to as the "light-off time."

The conventional method of heating the catalytic converter is to heat the catalyst by contact with high temperature exhaust gases from the engine. This heating, in conjunction with the exothermic nature of the oxidation reaction occurring at the catalyst, will bring the catalyst to light-off temperature. However, until the light-off temperature is reached, the exhaust gas passes through the catalyst relatively unchanged. In addition, the composition of the engine exhaust changes as the engine heats from the cold start temperature, and the catalyst monolith is typically designed to work best with the composition of the exhaust stream produced at the normal elevated engine operating temperature.

There have been several attempts to shorten or avoid the light-off time of the catalytic converter. Current techniques employ one of the following methods: electrical heating of the exhaust gases and/or of the catalytic converter itself; thermal insulation of the exhaust line and/or the catalytic converter; multi-chambered configurations of the catalytic converter; placing the catalytic converter adjacent to the engine for heating; combustion of fuels upstream of the catalytic converter; and catalytic combination of fuels and oxygen at the catalyst surface. All of these methods have drawbacks and limitations.

Placing the catalytic converter almost immediately adjacent to the engine is not desirable because of the tendency to overheat the catalyst with resulting accelerated degradation of the catalyst. Thermal insulation is also not a desirable option because of the same problems, especially during operation at maximum operating temperature ranges.

Electrical heating of catalytic converters ("EHC") has been a popular proposed method of attempting to preheat the catalyst monoliths. Limitations on the equipment and process, however, affect the utility of this method. The primary limitation on electrical preheating is the electrical energy required by the heater. The typical car battery is not a practical power source to supply the electrical power because the electrical load on the vehicle battery during the period required may exceed the rated battery output. In any event, the load placed on a typical 12 volt vehicle battery will shorten the lifetime of the battery. Also, there is a measurable delay between the time the operator of the vehicle places the ignition switch in the "on" position and the time the heater brings the catalyst to light-off temperature.

Typically, in the interval between start up and light-off, the exhaust stream is oxygen deficient. Because the catalyst requires oxygen to complete the catalytic reaction, supplemental air must be blown over the catalyst. Even when using a secondary air flow to overcome oxygen deficiency, the secondary air flow must be closely controlled to avoid an excess of oxygen, in which case the catalytic converter is less effective in reducing $NO_x$. However, it should be noted that $NO_x$ contributes a very small portion of unacceptable emissions when an engine is cold; most of the cold start emissions that must be dealt with comprise HC, CO and the like.

An alternative to battery powered electrical heating has been to decrease the strain on the power supply by supplying the power directly from an alternator rather than directly from the vehicle battery. An alternator powered, electrically heated catalyst ("APEHC") still requires a 5 to 10% increase in battery capacity to cope with the EHC start-up scenario. Even with the APEHC system, there is still a concern with respect to battery capacity because electrical heating is needed for an extended period of time, i.e., more than 25–30 seconds. In addition, the maximum alternator power output required in the APEHC system requires a complicated switching mechanism and an altered alternator speed between 2,000 and 4,500 rpm during the heating up time period, and the alternator must be oversized.

The multi-chamber configurations of catalytic converters generally conform to one or two theories. In one multi-chamber configuration, a small portion of catalyst known as a "starter catalyst" is positioned upstream from the primary catalyst. This "starter catalyst" is generally closer to the exhaust manifold. This location, in conjunction with a smaller thermal mass associated with its smaller size and materials of construction, causes the catalyst to heat much more quickly than the primary catalyst. This configuration, however, is generally unacceptable because the starter catalyst in the exhaust stream creates a higher back pressure which reduces the overall engine efficiency and robs the engine of power output.

Another method of providing multiple chambers in the exhaust flow includes a first catalyst having low temperature characteristics used only during cold start conditions, and, after the catalyst temperature rises to a certain elevated level, the exhaust gas flow is switched to pass through the conventional catalytic converter configuration. A variation of this approach is to run all cold start emissions through a separate absorber (such as a zeolite or a molecular sieve-type substance) where unacceptable emissions are captured and later released back into the exhaust stream. This method, however, is impractical because of the complicated switching mechanism used to divert flow to the absorber, the size and space requirements of the absorber, and the impracticality of releasing the unacceptable emissions from the absorber back into the exhaust stream.

An additional method for reducing cold start emissions runs the engine excessively rich in the cold start condition and ignite the resulting super-rich mixture to directly heat the catalyst. This approach has proved wholly unreliable and has other serious drawbacks, including reduced engine and catalyst life.

Catalytic combination of a fuel with oxygen at the surface of the catalyst generates heat that can rapidly bring the catalytic converter to light off temperature. For example, the introduction of hydrogen to a TWC catalyst can heat portions of the catalyst to 300° C. or greater within a period of several seconds. However, the significant amount of hydrogen necessary to cause this rapid, high temperature heating makes it impractical to store enough hydrogen for any large number of heating cycles. Consequently, it is a practical result that hydrogen must be generated onboard the vehicle.

Hydrogen generation using a proton exchange membrane electrolyzer is described by Appleby in U.S. patent application Ser. No. 08/320,171. Appleby teaches the use of an electrolyzer to convert water to hydrogen gas at the cathode. The hydrogen may then be collected and/or dried for use upon demand. However, the continued operation of the electrolyzer is dependent upon the availability of water to the electrolyzer. While the electrolyzer may be provided with a refillable water reservoir located under the hood, this setup leaves the emissions control system reliant upon the user to actually maintain the water level.

Benz et al. (U.S. Pat. No. 5,658,449) teaches a method and a device for nitrogen oxide reduction in a vehicle's exhaust gas by its reduction with hydrogen gas on a catalyst mounted in the exhaust system. Benz et al. proposes two methods of generating the required amount of hydrogen, via electrolysis of water aboard the vehicle, or via chemical production of hydrogen from a fuel, e.g., methanol, gasoline, or diesel fuel, via the well-known steam reforming reaction. Benz et al. also teaches that, in association with the former approach, the water required by an electrolyzer may be recovered from the vehicle's exhaust gas system. While Benz refers more specifically to the operation of a diesel engine, it is well known that today's gasoline engines operate at close to stoichiometric fuel-air levels, i.e., very little free oxygen is present in the vehicle's exhaust.

A major limitation of the Benz et al approach is the difficulty in condensing water under the conditions desribed. For example, a gasoline-type fuel is arbitrarily represented to have a chemical composition corresponding to octane, $C_8H_{18}$, or in shorthand, $CH_{2.25}$, then 3.125 atoms of oxygen are required for complete combustion of the fuel to give carbon dioxide ($CO_2$) and water vapor ($H_2O$). While in practice combustion is not complete, in a modem engine with emphasis on reduction of exhaust emissions it is very nearly so, so that this approximation will serve.

Oxygen ($O_2$) comprises approximately 21% by volume of dry air, the remainder being the inert gas nitrogen with about 1% argon and other inert trace gases. Ambient air at 25° C. at 60% of its saturation level with water vapor contains 1.88% by volume of water vapor. The amount varies with temperature and degree of saturation, but it never exceeds 6.5% under extreme tropical conditions. Thus, typical 25° C.

ambient air has the composition 20.6% by volume oxygen, 77.5% inert gases, and about 1.9% water vapor, which also corresponds to its molecular composition. 20.6 molecules (41.2 atoms) of oxygen will combust 13.184 ($CH_{2.25}$) units, giving 13.184 molecules of $CO_2$ and 14.832 molecules of $H_2O$. The exhaust gas will therefore have a rounded composition of 13.2 $CO_2$, 16.7 $H_2O$, and 77.5 inert gases, giving a total of 107.4 molecules from the original 100 of air. The exhaust gas therefore contains 15.5% by volume of water vapor. When the engine in the vehicle is operating, the exhaust gas is extremely hot, therefore water recovery will require cooling, since condensation will not start to occur until it is cooled to 55° C. Under extreme tropical conditions, a similar calculation shows that the corresponding exhaust gas composition contains a total of about 19.3% $H_2O$, which will require a condensation temperature of less than 59.6° C. The total water requirement for the Benz et al. disclosure under cruise conditions is 0.035 kg of water per hour, which is continuously removed from the exhaust gas produced by the engine. At a probable fuel consumption of 28 mpg (11.9 km/liter, 17.0 km/kg) under 92.2 km/hr (maximum) FTP cycle conditions, the maximum speed of this cycle, fuel consumption is about 5.42 kg per hour.

This amount of fuel yields 7.7 kg of water when combusted. Hence, less than 0.5% of the water produced need be collected. However, exhaust gas from a hot engine is at a high temperature, in excess of 350° C., and means must be found to cool about 78.4 kg per hour of exhaust gas from this temperature to 55° C. (under the stated 25° C. ambient temperature conditions) to condense some of the water. Actual condensation of the small amount of water required will require the removal of about $\frac{1}{1000}$ of the heat removed from the hot gas. The latter will require 25° C. ambient air in a quantity equal to about 10 times the weight of the exhaust gas per hour. Under 34.1 km/hr (maximum) FTP cycle conditions, internal combustion engine characteristics are such that the fuel consumption (in mpg, km/liter, or km/kg) will not change much, so that at the maximum speed of this cycle the fuel consumed is about 2.0 kg per hour, and the quantities of water vapor and total exhaust gas produced must be correspondingly less, namely 2.85 and 28.9 kg per hour. The quantity of exhaust gas to be handled at a steady 92.2 kph is 68,000 liters of exhaust gas per hour (about 19 liters per second). This must be handled in such a way as to cause no back-pressure on the engine. The necessary exhaust gas-to-air heat exchanger will require a very large surface area for effective heat transfer to take place. In general, the amount of heat rejected from the engine in the form of hot exhaust gas from an internal combustion engine is as much as three times the amount rejected from the liquid-cooled radiator. Since the exhaust gas-to-air heat exchanger (condenser-radiator) must work under similar conditions to this radiator (i.e., under all practical operating conditions, including idle, and all outdoor temperatures), and will have a similar heat rejection temperature to air, a very large radiator will be required. This solution is therefore not practical.

Therefore, there is a need for a reliable water supply for the automotive electrolyzer. It would be desirable if the water supply were replenishable without human involvement. It would be even more desirable if the water could be supplied in sufficient quantities to support hydrogen generation and storage for use during cold starts and/or for continuous use combating nitrogen oxide emissions.

SUMMARY OF THE INVENTION

The present invention provides a self-replenishing water source for an electrolyzer onboard an automobile comprising a condensate collection reservoir; and a means of transferring the water having an inlet in fluid communication with the condensate reservoir and an outlet in fluid communication with a water reservoir. The condensate collection reservoir may be located in the muffler or in the tail pipe. Furthermore, the water source may further comprise a filter and either a deionization bed or a distillation apparatus in fluid communication between the condensate reservoir outlet and the water reservoir.

The invention also provides an on-board hydrogen generation system, comprising: a condensate collection reservoir; a conduit providing fluid communication between the condensate collection reservoir and an anode water reservoir; an electrolyzer having an anode in communication with the anode water reservoir, a cathode, and a proton exchange membrane disposed between the anode and the cathode; and a source of electrical current having a positive terminal coupled to the anode and a negative terminal coupled to the cathode.

Further, the invention provides a method for providing water to an electrolyzer on board an automobile comprising the steps of: condensing water vapor to form a condensate; collecting the condensate; and supplying the condensate to the electrolyzer. Water vapor may be condensed in some region of the exhaust system using cooling fluid from the radiator system. The method may further comprise filtering and purifying the water and may also further comprise storing the water in a water storage reservoir.

BRIEF DESCRIPTION OF THE DRAWINGS

So that the features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
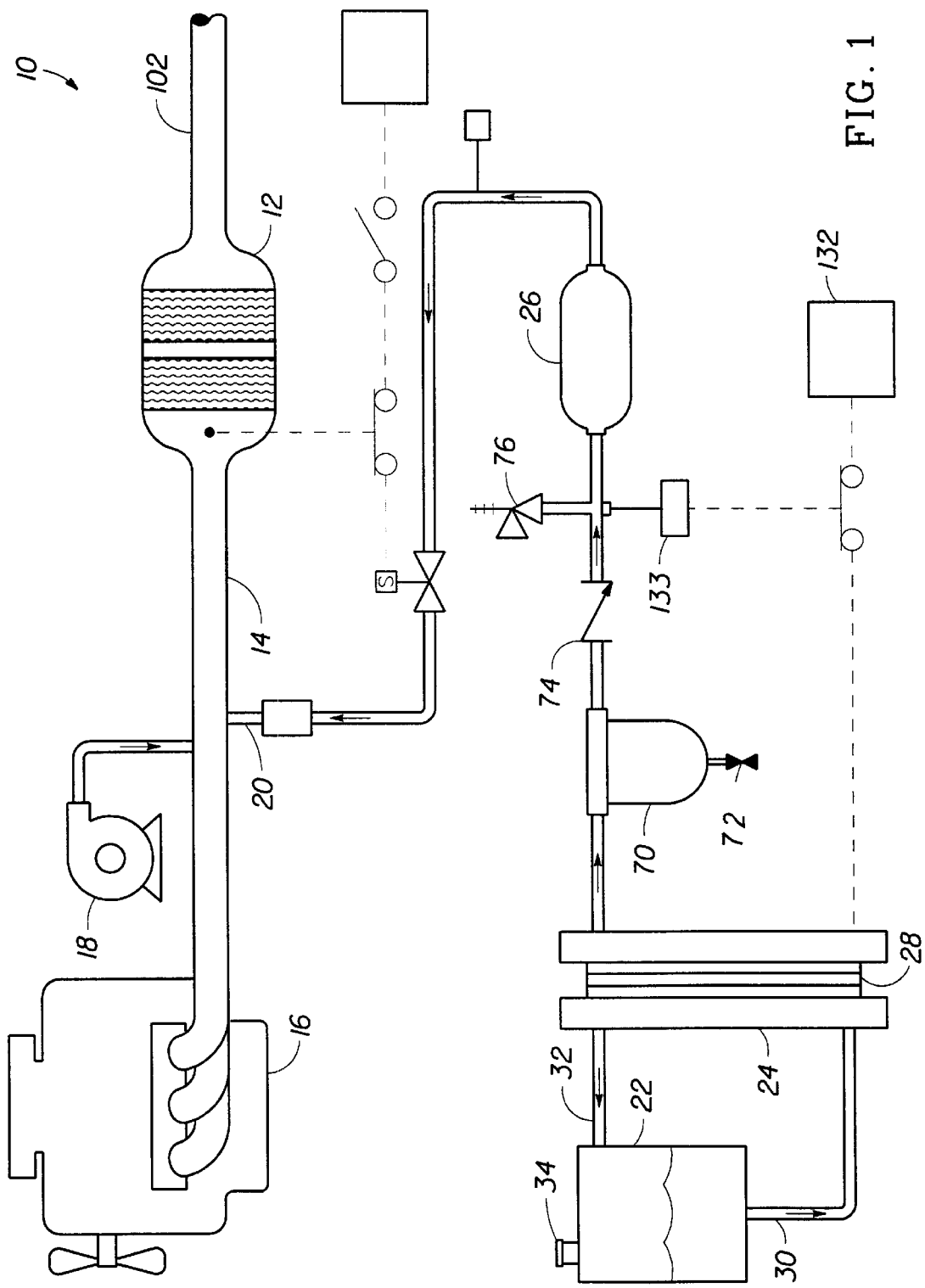
FIG. 1 is a schematic diagram of a hydrogen production and delivery system of the present invention for heating a catalytic converter.

The present invention provides a method and apparatus for providing a source of water on-board an automobile without requiring intervention by an operator. The source of water may be used in various manners and for various purposes, including replenishment of water reservoir levels and consumption by an on-board electrolyzer for producing hydrogen. While the water source may utilize electrical power from the automobile for operation, for example to power a pump, the water source may be designed to operate in a completely or mostly passive manner.

In one aspect of the invention, water is obtained by condensing water vapor from various vapor or gas streams available on, in, or to, the automobile. Water vapor streams that may be condensed include the cabin air, steam from the radiator, ambient air or exhaust gas passing through the muffler or tail pipe, and the like. Each of these water vapor streams presents unique conditions for condensing the water vapor and collecting the liquid water. Differing process conditions and environmental factors affect the reliability, operability and capacity of the various water vapor streams.

In another aspect of the invention, water condensed from the vapor streams may optionally be passed through a filter, such as a porous carbon fiber material, porous ceramic, or porous metal, and/or a deionization resin bed to remove undesirable particulates, contaminants and salts. Optionally, the system for providing water may include a pump, capillary action, or gravity flow to transfer the water from the condensing surface through the filter and resin bed or directly to a water reservoir.

In yet another aspect of the invention, water condensed in accordance with the invention is prevented from freezing. Optionally, the water may be transferred or maintained in thermal communication with a component of the automobile that is warm during operation, for example the exhaust system or engine. Furthermore, the water may be optionally collected through a conduit that will empty when water collection is completed. In each or a combination of these configurations, the water may be prevented from forming ice within the conduit and possibly causing damage to the system or failure of the water collection system.

In a further aspect of the invention, systems may optionally be provided to cause or enhance the condensation of the water vapor. Condensation may be caused using cooling coils such as those in an air conditioning unit, thermoelectric devices in combination with or independent of any air conditioning unit, steam condensing coils having forced air circulation therearound and the like.

In yet a further aspect of the invention, the water sources of the present invention may be provided at ambient pressure or at elevated pressure, such as by a water pump, an electrolytic pump or by direct communication with the pressurized steam from the radiator.

Preferably, the water source is of suitable quantity and quality to be used in the electrolytic production of hydrogen. The catalytic converter of the automobile may be chemically heated by feeding hydrogen to the catalyst along with some air or oxygen. It is desirable to heat the catalyst in order to enhance the conversion of unacceptable emissions emanating from an internal combustion engine into water and other acceptable emissions. In one aspect of the invention, hydrogen gas is supplied from an electrolyzer or other hydrogen source and injected into the monolith of a catalytic converter to more rapidly bring the catalyst to a light-off temperature. Heating or thermally conditioning a catalyst in accordance with the invention rapidly brings the catalyst up to the light off temperature for the efficient conversion of pollutant gases, such as unacceptable emissions emanating from an internal combustion engine, into water, carbon dioxide and other acceptable emissions.

FIG. 1 shows a system 10 of the present invention installed on a vehicle exhaust system. The vehicle includes a catalytic converter 12 located in an exhaust line 14 from the exhaust manifold of a vehicle's engine 16. The exhaust line 14 is provided with air from an air pump 18 and hydrogen from a hydrogen inlet line 20. The air pump 18 could be any suitable air source, such as a blower, for injecting air into the exhaust line 14 at suitable pressure and volumetric flow rate to achieve a suitable or ideal air/hydrogen ratio mixture.

The hydrogen supply system of the invention generally includes a water reservoir 22, an electrolyzer 24, and a hydrogen storage cylinder 26. As shown in FIG. 1, the electrolyzer 24 may preferably compromise a plurality of stacked identical cells 28. The reservoir 22 serves both as a water reservoir and as a separator for oxygen and water. The reservoir 22 may be a vehicle's windshield washer fluid storage container, but is preferably a dedicated reservoir allowing separation of oxygen from the water withdrawn from port 34. Water flows by gravity drain or is pumped from the reservoir 22 to the electrolyzer 24 via a drain line 30. As the electrolyzer produces hydrogen and oxygen, the oxygen and entrained water flows naturally back to the reservoir 22 via a return line 32.

Figure 2:
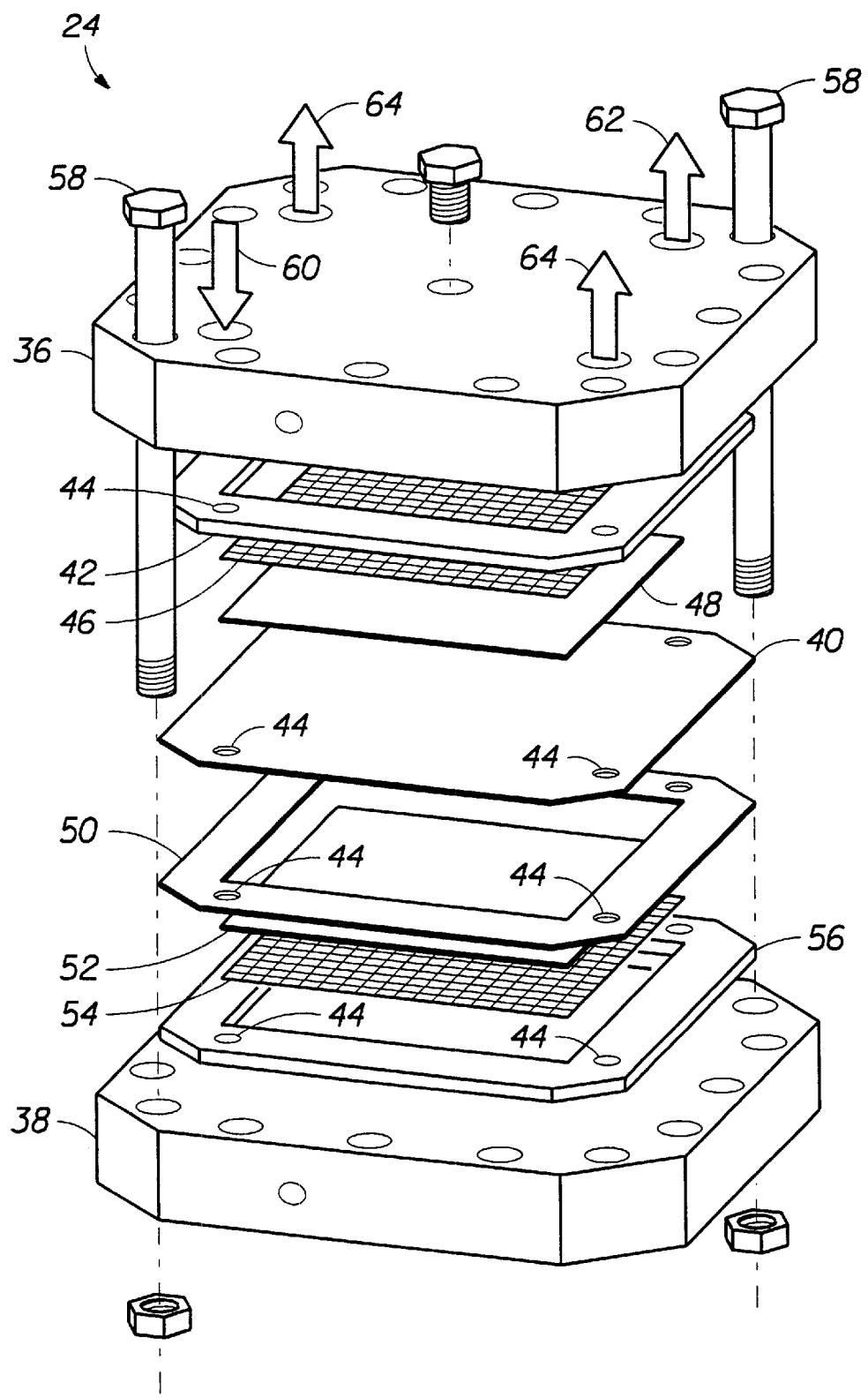
FIG. 2 is an exploded view of an electrolyzer suitable for use in the system of FIG. 1.

The next major component of the hydrogen source is the electrolyzer 24, shown in greater detail in FIG. 2. In the following description of the electrolyzer 24, the materials of construction referred to as "preferred" are the material actually used in a test device to prove that the invention would work for its intended purpose. In commercial production models of the present invention, where possible, less expensive materials may be used throughout, such as carbon steel for titanium where possible, and plastic such as polypropylene where heat and stress will permit the use of such material.

The electrolyzer 24 may be referred to herein as a proton exchange membrane (PEM) electrolyzer. The proton exchange membrane 40 itself may prove corrosive in this environment in contact with certain substances, thus requiring the careful selection of the material of construction of the electrolyzer. For example, the PEM 40 will preferably only contact carbon or graphite. However, those of skill in the art will readily recognize that materials less exotic than those listed in the following discussion can be readily employed without penalty for components that are located away from the PEM material itself and the oxygen electrode catalyst. For example, graphite will be the material of choice in certain structural elements, and not some obvious candidates such as copper, aluminum, or iron, which can corrode thus forming ions that can poison the oxygen and/or hydrogen electrode catalysts.

In FIG. 2, the PEM electrolyzer 24 is shown as a cell stack including a pair of endplates 36 and 38. The endplates 36 and 38 are preferably titanium. Adjacent the top endplate 36 is an anodic cell frame 42. The cell frame 42 is preferably a carbon fiber-filled Teflon sheet, sold under the trademark Zymaxx by Du Pont. The cell frame 42 retains a 1:1 molar ratio of iridium and ruthenium dioxides ($IrO_2$/$RuO_2$) as the anodic electrocatalyst. The cell frame 42 also includes a plurality of flow ports 44 to permit the supply of reactant (water) and/or removal of electrolysis product (oxygen gas). An expanded titanium metal current collector (flow field) 46, preferably 25 Ti 40-3/32 from Exmet Corp. and an anode substrate 48, preferably a porous titanium plate measuring about 0.05 inch thick, are disposed within the cell frame 42. Adjacent the anode substrate 48 is the proton exchange membrane 40, preferably cut from a sheet of perfluoronated sulfonic acid polymer, such as NAFION 117 available from Du Pont of Wilmington, Del., which serves as a solid electrolyte material and is preferably about 175 $\mu$m thick.

FIG. 2 depicts a gasket 50, one of perhaps several installed where required. Gaskets 50 are preferably stamped from 0.033 inch thick fluorosilicone sheet (Viton) and from 0.005 inch thick unsintered PTFE sheet. The electrolyzer 24 further includes a cathodic gas diffusion cathode 52 and an expanded titanium flow field 54.

Finally, the PEM electrolyzer 24 includes a cathodic cell frame 56, preferably made of polychlorotrifluorethylene (PCTFE) sheet, sold under the trademark KEL-F by Afton Plastics. The cathodic cell frame 56 retains flow field 54 and the gas diffusion cathode 52.

As shown in FIG. 2, the various components of the PEM electrolyzer are stacked together and retained with a plurality of tie rods 58, preferably 16 such tie rods. Stainless steel tubing, such as SS316, are then screwed into four threaded ports on one of the titanium endplates. The ports typically include a water inlet port 60, the oxygen outlet port 62, and a pair of hydrogen outlet ports 64. To minimize electrical contact resistance, the titanium endplates 36 and 38, as well as the expanded titanium metal current collectors 46 and 54, may be electroplated with a thin film of gold or other noble metals, such as platinum.

The cathode and the anode of the electrolyzer are of special construction. The cathodic electrode structure for hydrogen evolution is fashioned from a commercially available fuel cell gas diffusion layer on a carbon cloth backing, which acts as a support for the active hydrophilic electrocatalyst layer. This active layer contains high surface area colloidal platinum (100/$m^2$/g), supported on carbon black (60 wt % Pt on C), yielding a platinum loading of 4.0 mg/$cm^2$. The cathodic electrode structure, having an area of 40 $cm^2$, was hot-pressed onto one side of a segment of precleaned NAFION 117 PEM material. Hot-pressing was carried out between the plates of a hot-press elevated to 200° C. for 60 seconds using a force of about 15,000 pounds.

For the anodic electrocatalyst layer, a 1:1 molar ratio of iridium and ruthenium chlorides are dissolved in ca. 8 ml of concentrated HCl and heated to almost dryness. The resulting chlorides are then dissolved in isopropanol to make an ink-like coating. A porous titanium plate, 0.05 inch in thickness from Astro Met of Cincinnati, Ohio, is etched in 12% $HBF_4$ for 60 seconds and rinsed with isopropanol. This substrate is then coated with the ink-like mixture and the solvent evaporated under low heat of about 90° C. This coating and drying procedure may be repeated any number of times, preferably several times and most preferably seven times, before the electrode is heated in a furnace at 400° C. for 10 minutes in ambient air. The coating, drying, and furnace treatment is repeated twice more, but with a final baking time of two hours instead of 10 minutes.

Referring back to FIG. 1, the system further includes a hydrogen storage cylinder 26 and various supporting components in addition to the reservoir 22 and the electrolyzer 24, described above. The supporting components optionally include a liquid water trap 70 to eliminate most of the entrained water from the hydrogen exiting the electrolyzer, a solenoid valve 72 to blow out the trap, a check valve 74, and a pressure relief valve 76 to protect the system against over pressurization.

As previously described, the electrolyzer 24 includes a proton exchange membrane in its construction so that generated oxygen is vented to the water reservoir 22 and the hydrogen generated can be accumulated at pressure. Prior to operation, the system permits purging of the hydrogen handling system with an inert gas, such as nitrogen, to remove all air from the system downstream of the check valve 74. Furthermore, the control of hydrogen to the catalyst in the catalytic converter may optionally be managed by a controller and solenoid valve. The introduction of hydrogen may be initiated by a switch, such as the automobile's ignition switch or a dedicated preheat switch, and stopped upon reaching a given temperature within the catalyst.

Figure 3:
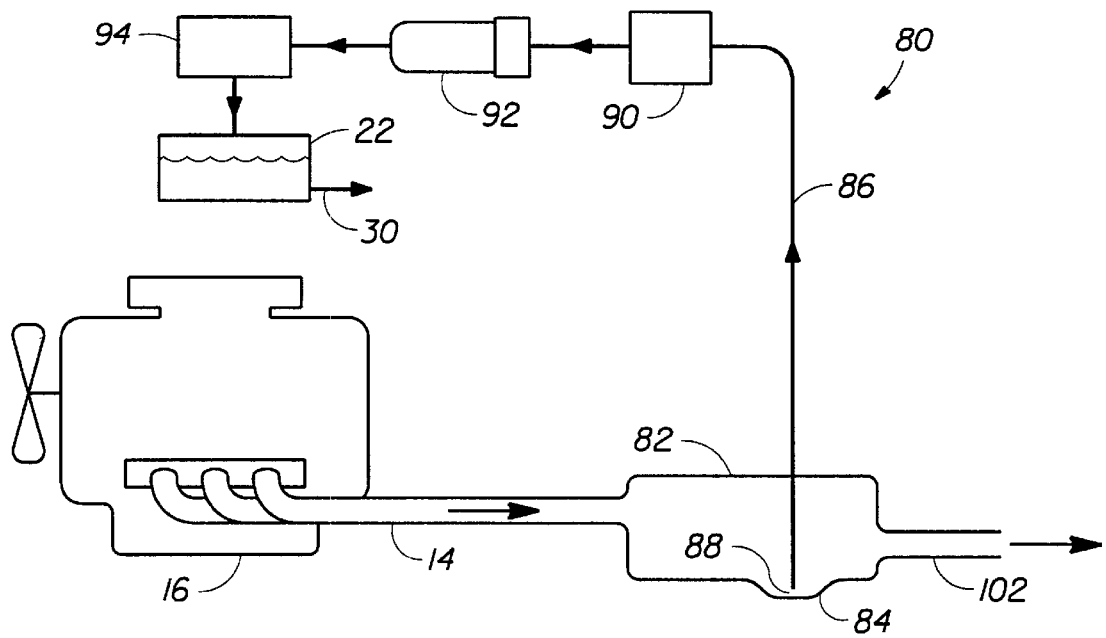
FIG. 3 is a schematic diagram of a water collection system taking water condensing in the exhaust muffler of an automobile.

FIG. 3 is a schematic diagram of a system 80 for collecting condensate from the muffler 82 in the exhaust line 14 of an automobile's engine 16. Warm water vapor in the exhaust gases may condense in contact with the cooler surfaces of the muffler 82, particularly when the engine is first started or in idle and the muffler is presumably at or near ambient temperatures. In accordance with the invention, the muffler is provided with a collection reservoir or pan 84 that allows the condensate to accumulate. A small pipe or other channel 86 is provided in communication with the reservoir 84 from either above or below the reservoir 84 in order to withdraw the water as it accumulates. The pipe 86 is shown here having a terminal end extending into the reservoir 84, but maintaining a gap 88 between the terminal end and the wall of the reservoir 84. When the reservoir is filled, a suction pump 90 draws the water up the pipe 86 and through a filter 92, cation/anion exchange resin bed 94 and into the water reservoir 22. The pump 90 is preferably capable of running dry and self-priming. Optionally, the system 80 may be run only during periods when the muffler is expected to be cool, such as during engine startup or when the car is idling.

Figure 4:
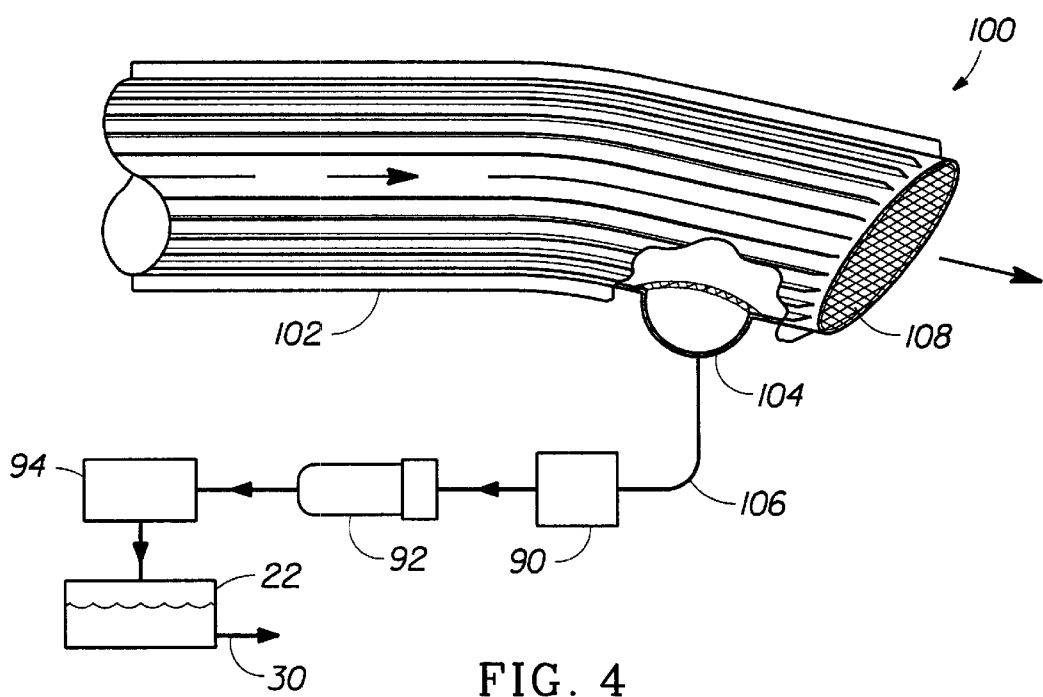
FIG. 4 is a schematic diagram of a water collection system taking water condensing in the exhaust tailpipe of an automobile.

FIG. 4 is a schematic diagram of a system 100 for collecting condensate from the exhaust tailpipe 102 of an automobile. The preferred location for collecting tailpipe condensate is near the terminal end of the tailpipe, since this location is the farthest from the engine (coolest) and condensate may even be collected from the ambient air, presumably because the reciprocating action of the engine causes air to be pulled into the tailpipe as well as exhausting gases. It is preferred that the tailpipe 102 includes a screen 108 to resist entry of dust, dirt and other foreign matter from entering the tailpipe 102.

In order to enhance condensation in the tailpipe, the terminal six to twelve inches or so of the tailpipe may optionally include one or more cooling fins around the exterior of the pipe. The flow of air passing over the tailpipe as the automobile travels will cool the tailpipe.

A water collection reservoir 104 is located along the bottom surface of the tailpipe 102 to capture or collect condensate. While the water may be withdrawn from above (as with pipe 86 of FIG. 3), the water is shown here being withdrawn through a drain tube 106 in fluid communication with the reservoir 104. The remainder of the water collection system 100 operates in a fashion similar to system 80 of FIG. 3.

Figure 5A:
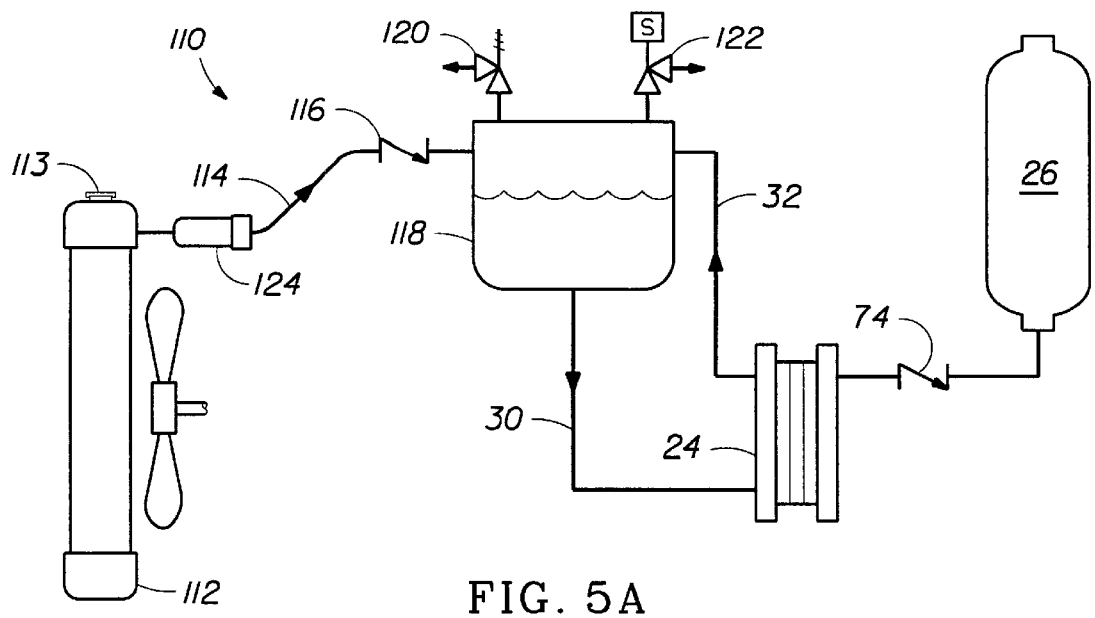
FIGS. 5A and 5B are schematic diagrams of water collection systems that condense steam from the radiator of an automobile.

FIG. 5A is a schematic diagram of a water collection system 110 that condenses steam from the radiator 112 of an automobile. A typical radiator system 112 will have a radiator cap 113 with a pressure relief set at about 12 psig. The system 110 communicates steam from the radiator through a steam line 114 and check valve 116 to a water reservoir 118 which operates above atmospheric pressure, but preferably no greater pressure than about 15–20 psig or thereabout. When the reservoir pressure is less than the radiator pressure, steam flows into the reservoir. Once the reservoir and radiator pressures roughly equilibrate or the pressure differential is insufficient to keep the check valve 116 open, then the check valve 116 closes. As the steam within the reservoir 118 condenses, the pressure in the reservoir drops. After the reservoir pressure drops a sufficient amount, the check valve will reopen to refill the reservoir with steam. Because the electrolyzer oxygen output line 32 is returned to the reservoir 118, the oxygen being generated by the electrolyzer will eventually increase the pressure in the reservoir and stop the passage of steam into the reservoir from the radiator. When the pressure in the reservoir gets too high, the solenoid valve 122 will open and release the oxygen, lower the reservoir pressure and allow additional steam to enter the reservoir. In this manner, the pressure in the reservoir 118 is controlled by a pressure relief valve 120 and a solenoid release valve 122 or, possibly, a controlled leak. This cycle continues to provide water to the reservoir 118 without reliance on operator attention.

The system will preferably include a filter 124 in the steam line 114 to prevent passage of particulates. Furthermore, because the water is collected by condensing steam, the water is substantially free of inorganic salts. Any traces of anti-freeze in the condensate prevents or at least suppresses freezing in the water reservoir.

Figure 5B:
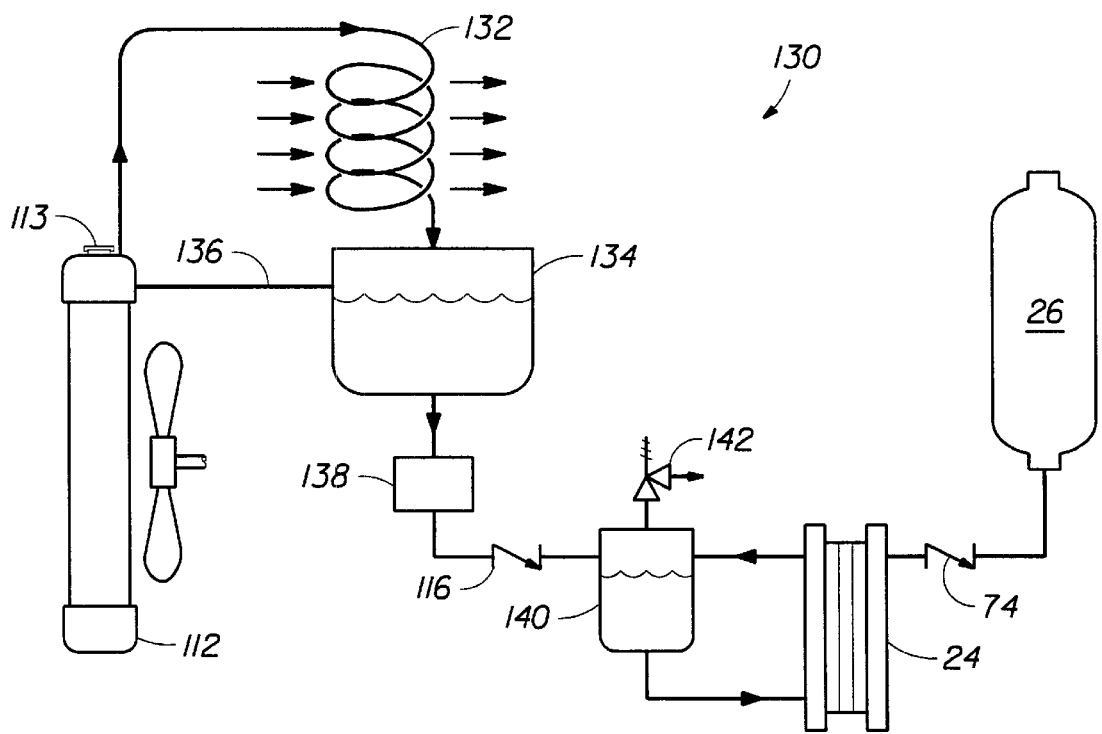

FIG. 5B is a schematic diagram of an alternate water collection system 130 that condenses steam from the radiator 112 of an automobile as it passes through the inside of a coil 132 that is cooled by passing air, presumably air rushing past as a result of the automobile's speed or radiator cooling fan. The condensate is collected into a reservoir 134. Should the reservoir 134 over fill, steam or condensate may pass through the conduit 136 back into the radiator 112 or to the cooling water reservoir. Condensate from the reservoir 134 may optionally be passed through a deionization bed 138 before being passed to the water reservoir 140 having a pressure relief valve 142 thereon. It should be recognized that the water collection system 130 operates at a pressure higher than that of the radiator, for example about 12 psig, higher than the radiator pressure.

Figure 6:
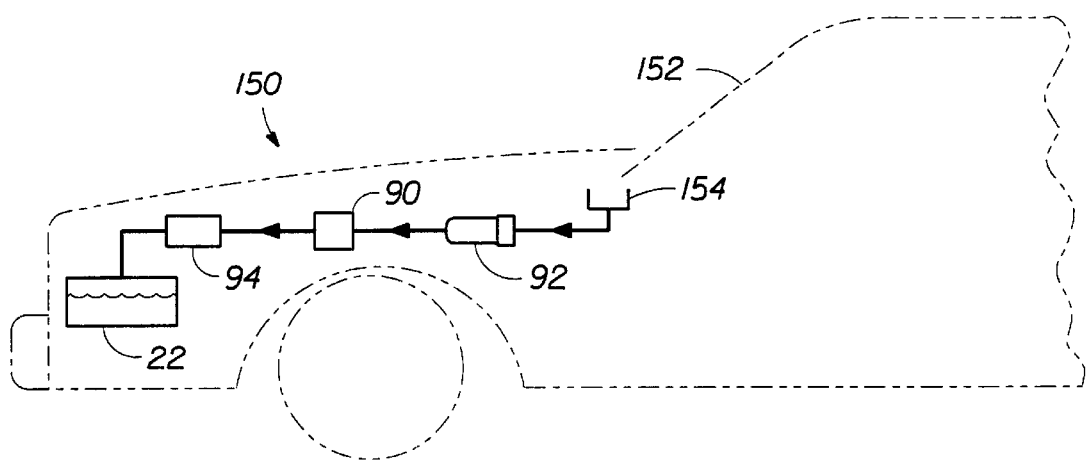
FIG. 6 is a schematic diagram of a water collection system taking water runoff from the windshield of an automobile.

FIG. 6 is a schematic diagram of a water collection system 150 taking water runoff from the windshield 152 of an automobile. While rainwater could be collected at various locations on an automobile, the front windshield 152 is preferred because there is already a built-in channel 154 for drainage of the water away from the windshield and because the windshield receives water not only during rainfall, but also during windshield cleaning and car washing.

Figure 7:
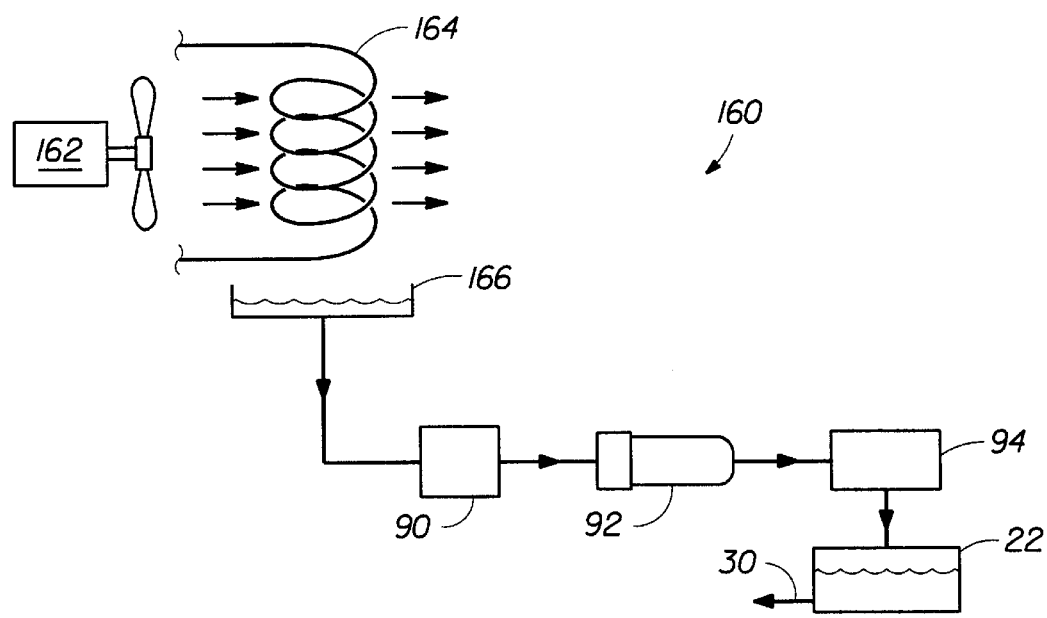
FIG. 7 is a schematic diagram of a water collection system condensing water out of ambient air or cabin air of an automobile.

FIG. 7 is a schematic diagram of a water collection system 160 condensing water out of ambient air or cabin air of an automobile. Conventional air conditioning systems include a fan 162 and a cooling coil 164 containing a refrigerant. As humid air passes over the cooling coil 164, water vapor may condense out of the air. In accordance with the present invention, a collection reservoir 166 is portioned below the coil 164 to catch the condensate as it drips off the coil. The condensate may then pass to the water reservoir 22 by gravity drain or by using pump 90. Preferably, the system will also include a filter 92 and resin bed 94. While this system is dependent upon the automobile in fact having an air conditioner installed, the same or similar results can be achieved by a dedicated system, perhaps based on the use of a thermoelectric cooling device or combination of devices to condense water vapor.

A preferred method of obtaining water from the exhaust gas produced by the engine involves condensing water from the exhaust gas only during a cold start of the engine. Alternatively, water condensing may be performed whenever (a) there is a need for more water, and (b) a water condensing portion of the exhaust gas system is at a temperature at or below that necessary to condense water from the exhaust gas. More specifically, the water is preferably condensed by a condenser that is heat exchanged with cooling fluid from the radiator system over a period of time following engine startup but before the maximum heat rejection load of the radiator is reached.

Water condensing may be achieved using a small heat exchanger or device which is in thermal communication with the exhaust gas system. The heat exchanger or device is preferably located downstream of the catalytic converter, e.g., either between the catalytic converter and muffler, or downstream from the muffler, to avoid heating the heat exchanger or device by hydrogen used in heating the catalytic converter on cold starting the engine. The heat exchanger or device preferably contains suitable metal winglets extending into the exhaust gas stream to create turbulence and to aid in heat transfer, which will also help prevent fouling, and may also include external fins for heat dissipation.

It is also preferred that the heat exchanger or device in the exhaust system be cooled by a fluid circulated through tubes from the engine's radiator cooling circuit. In this device, the fluid may be passed through a conduit having any of a variety of thermal relationships with the exhaust gas stream or exhaust gas system, including a conduit disposed within or around the exhaust gas conduit itself. Even at high ambient temperatures (40° C.), such a heat exchanger or device could condense 50% of the water out of the exhaust gas during the first five minutes after an engine cold start. Optionally, the flow of cooling fluid from the radiator could be automatically shut-off following condensation of an amount of water. It is also optional that the condensed water may be automatically transferred to a separate water storage reservoir.

Under 40° C. ambient conditions, it is estimated that 119 g of water could be condensed out of the exhaust gas from an engine producing 2.85 kg water vapor per hour, and 321 g of water could be condensed out of the exhaust gas from an engine producing 7.7 kg water vapor per hour, for an average of 220 g water per cold startup. This amount of water is sufficient to supply hydrogen for several hours for nitrogen oxide control (average 24 g per hour) by the method of Benz et al., and sufficient to heat up the catalytic converter for several cold starts, since it has been determined that 25 liters of hydrogen, corresponding to about 18 g of water consumed in the electrolyzer, are sufficient for this purpose. The water supply may also be supplemented, as necessary, by pure water condensate from the vehicle's air-conditioning heat exchanger. Under cold-weather conditions, this will not be available, but the engine cold start time will be longer, allowing for the recovery of more water from the exhaust gas produced by the engine.

Figure 8:
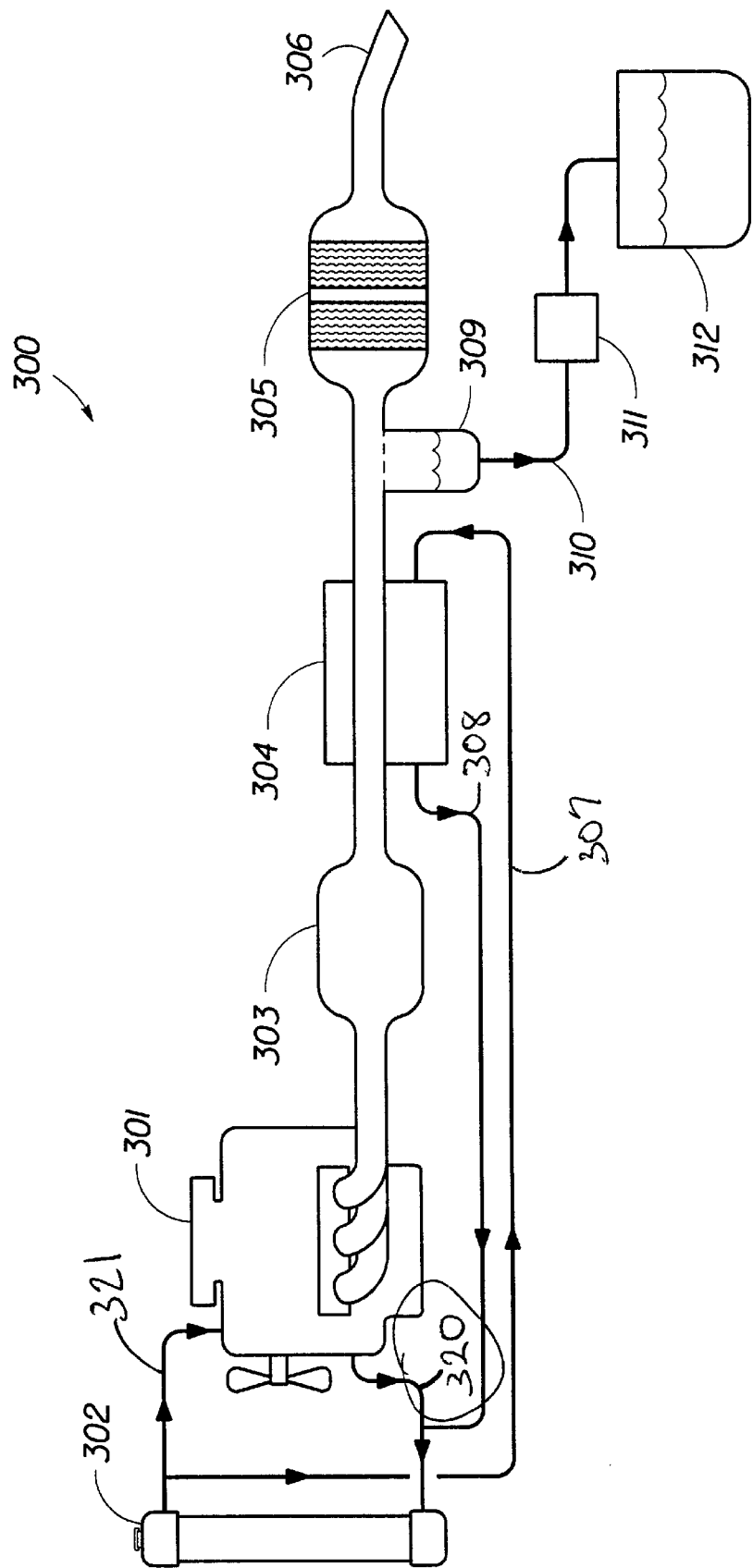
FIG. 8 is a schematic diagram of a liquid water recovery system that utilizes cooling fluid from an engine coolant system to condense water vapor from the engine's exhaust gas stream.

FIG. 8 is one embodiment of a liquid water recovery system that utilizes cooling fluid from the radiator attached to the engine of a vehicle to condense water vapor from the engine's exhaust gas stream. In this embodiment, the engine 301 has a liquid-to-air heat exchanger or radiator 302 to reject heat produced in the engine to the ambient. When the engine of the vehicle has not been operated for some time, the temperature of the entire engine and exhaust gas system 300 may be near ambient temperature. Under this condition, after the engine is started, cool liquid from the radiator 302 is generally prevented from flowing through the engine until the engine has reached a suitable operating temperature. During this warm-up period, the cooling liquid is circulated between the radiator and the exhaust gas system to condense water from the exhaust gas through the use of a liquid-to-gas heat exchanger 304 and water collection system 309 placed after the catalytic converter 303 and before the muffler 305. Alternatively, the heat exchanger and water collection system may be placed after the muffler 305 but before the tail pipe 306. Water collected in the condensate collection system 309 may be transferred through a fluid conduit 310 to a water pretreatment system 311 before storage in a water reservoir 312. The water pretreatment system 311 may include particulate filtering elements, activated carbon filters and mixed resin bed deionization cartridges.

Figure 9:
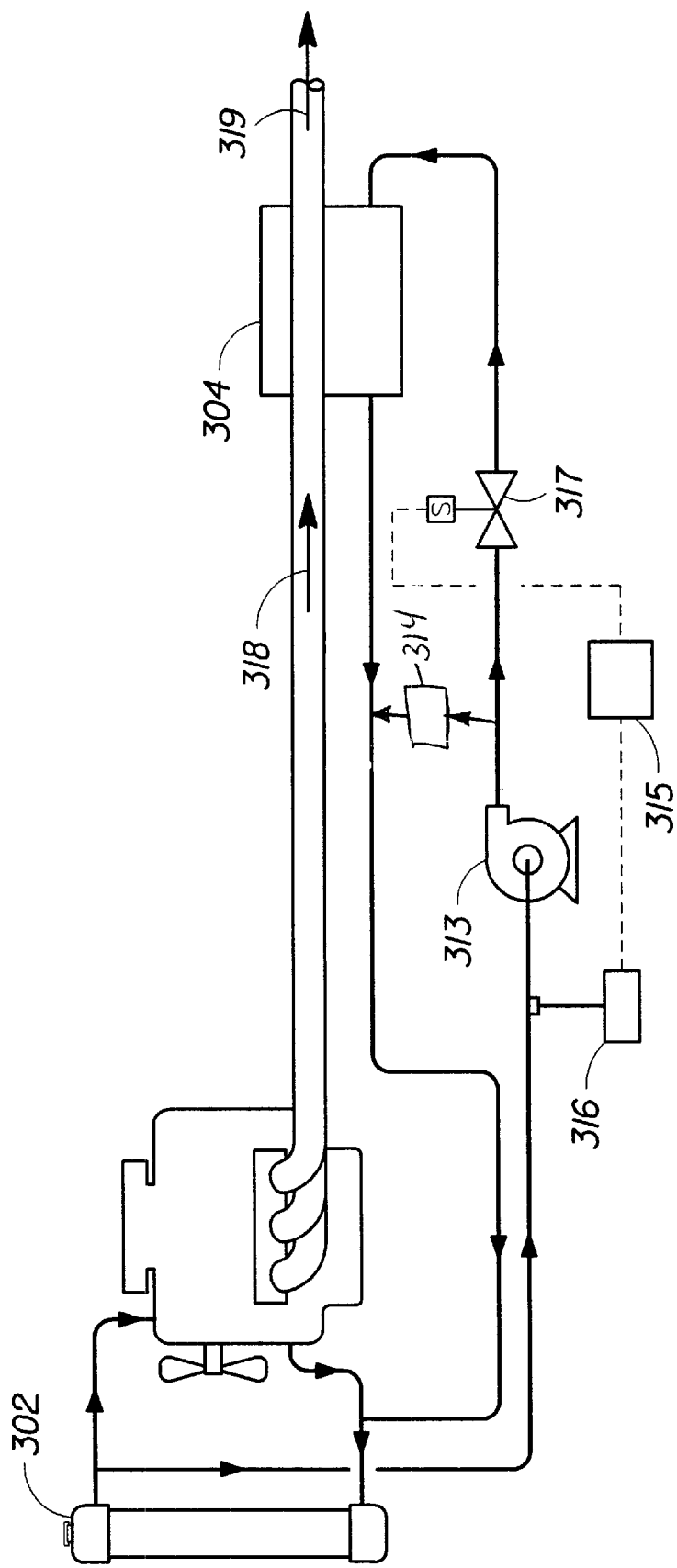
FIG. 9 is a schematic diagram of a liquid water recovery system having an electronic control scheme to limit the heat load of an exhaust gas heat exchanger on the engine coolant system.

FIG. 9 shows one embodiment of an electronic control scheme to limit the heat load of the exhaust gas heat exchanger 304 on the engine cooling system. The cooling system includes a radiator 302, water circulation pump 313, and the engine water cooling system 314. In this embodiment, the engine management system 315 monitors many system parameters such as the temperature of the engine or cooling system 316. This engine temperature may be used to change the position of a valve 317 which allows or prevents cooling fluid from circulating between the radiator 302 and the exhaust gas heat exchanger 304. In one possible control scenario, cooling fluid from the radiator 302 is allowed to flow through the exhaust gas heat exchanger 304 where it serves to cool the hot exhaust gas 318 from the engine resulting in water being condensed from the cool exhaust gas 319 in either the heat exchanger 304 or in a follow on condenser. When the engine reaches the desired operating temperature the control valve 317 may be closed to remove the heat load of the heat exchanger 304 from the radiator 302. In another scenario, or possibly under extreme conditions, the exhaust gas water condenser system may be allowed to operate until the radiator has reached its maximum heat rejection capabilities and the valve 317 must then be closed to prevent the engine cooling system from being overloaded giving rise to an overheated engine. In some circumstances, it may be desirable to utilize the heat in the hot exhaust stream to reduce the warmup time of a cold engine. In this mode of operation, the control system may allow the circulation of cooling fluid between the exhaust heat exchanger until the engine has reached a desired temperature.

Figure 10:
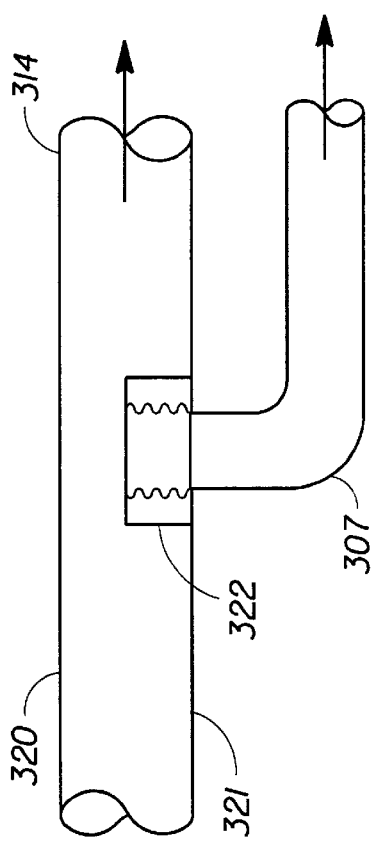
FIG. 10 is a schematic diagram of a liquid water recovery system having a control system that is independent of the engine management system.

FIG. 10 shows an alternate embodiment of a control system which does not rely on the engine management system for control. A thermostatic expansion valve 322 may be placed in a primary coolant conduit 320 or 321 leading to, or away from, the engine cooling system 314 respectively. The closing temperature of this thermostatic element can be selected such that cooling fluid flow to the exhaust gas heat exchanger through coolant line 307 is directly controlled by the temperature of the coolant. In this manner, surplus heat removal capacity of the radiator may be automatically utilized by the exhaust gas heat exchanger and condenser system and waste heat from the exhaust system may be used to warm the engine without an external control system.

Figure 11:
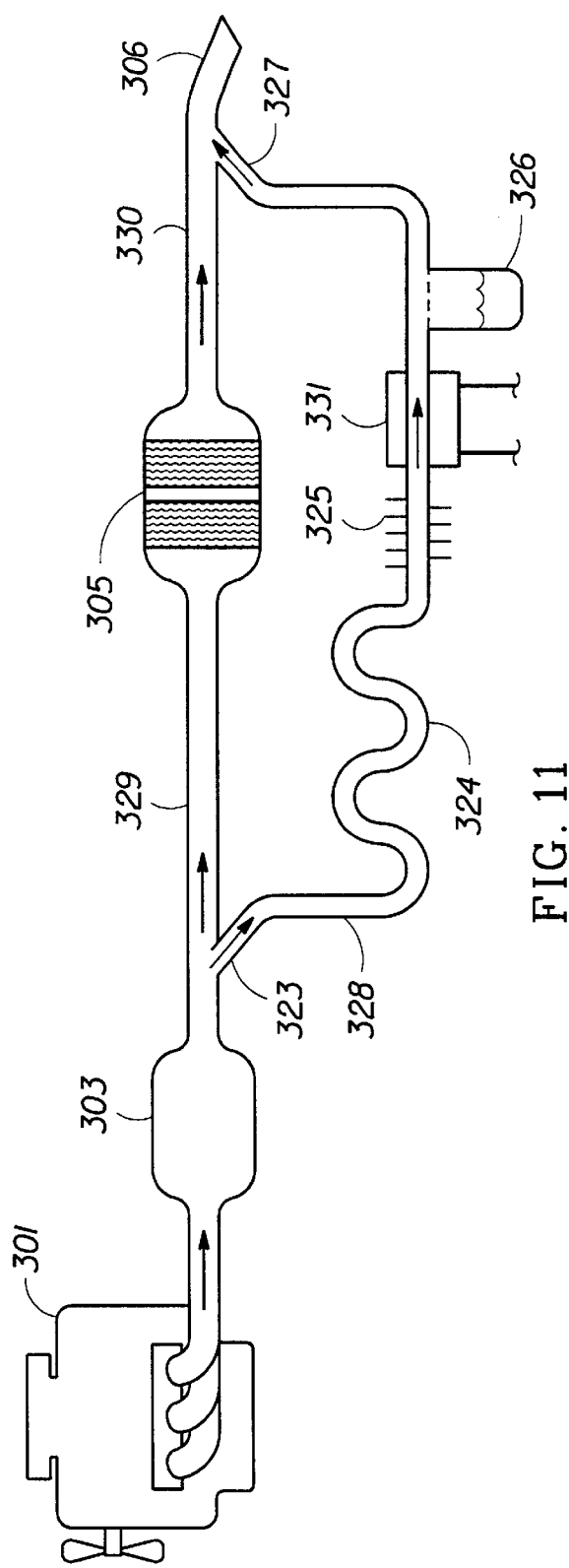
FIG. 11 is a schematic diagram of a liquid water recovery system having a slip stream capable of continuous operation.

FIG. 11 is an embodiment of the engine exhaust water vapor condensation system which provides a continuous mode of operation. It is recognized that only a small portion of the water vapor in the exhaust gas stream is required for any process which may consume water on-board a vehicle. Actively cooling all of the exhaust gas from an engine is impractical due to the quantity of the exhaust gas and velocity of the exhaust gas through the exhaust system. In this continuously operating system, exhaust gas from the engine 301 passes through the appropriate after treatment system 303, such as a catalytic converter, and is divided into two streams with the primary exhaust gas stream continuing through the muffler 305 and tail pipe 306. At some point in the exhaust system, a portion of the exhaust gas is separated using a flow divider 323 which allows a fraction of the exhaust gas to flow through a conduit 328 at a much reduced velocity. This slip stream of exhaust gas is then cooled as it travels through the length of the conduit, represented as 324, or by utilizing finned heat exchangers 325 or a liquid cooled heat exchanger 331 or any combination of condensers. Condensed water is collected in a collection subsystem 326 before the exhaust gas is rejoined with the primary exhaust gas stream at 327. Through design of the size, length, and flow resistance of the primary exhaust stream 329, 305, 330 and the low-flow slip stream 328, 324, 325, 331, 326, 327, the degree of cooling of the exhaust gas slip stream and subsequent condensation of water from the exhaust gas can be engineered.

Figure 12:
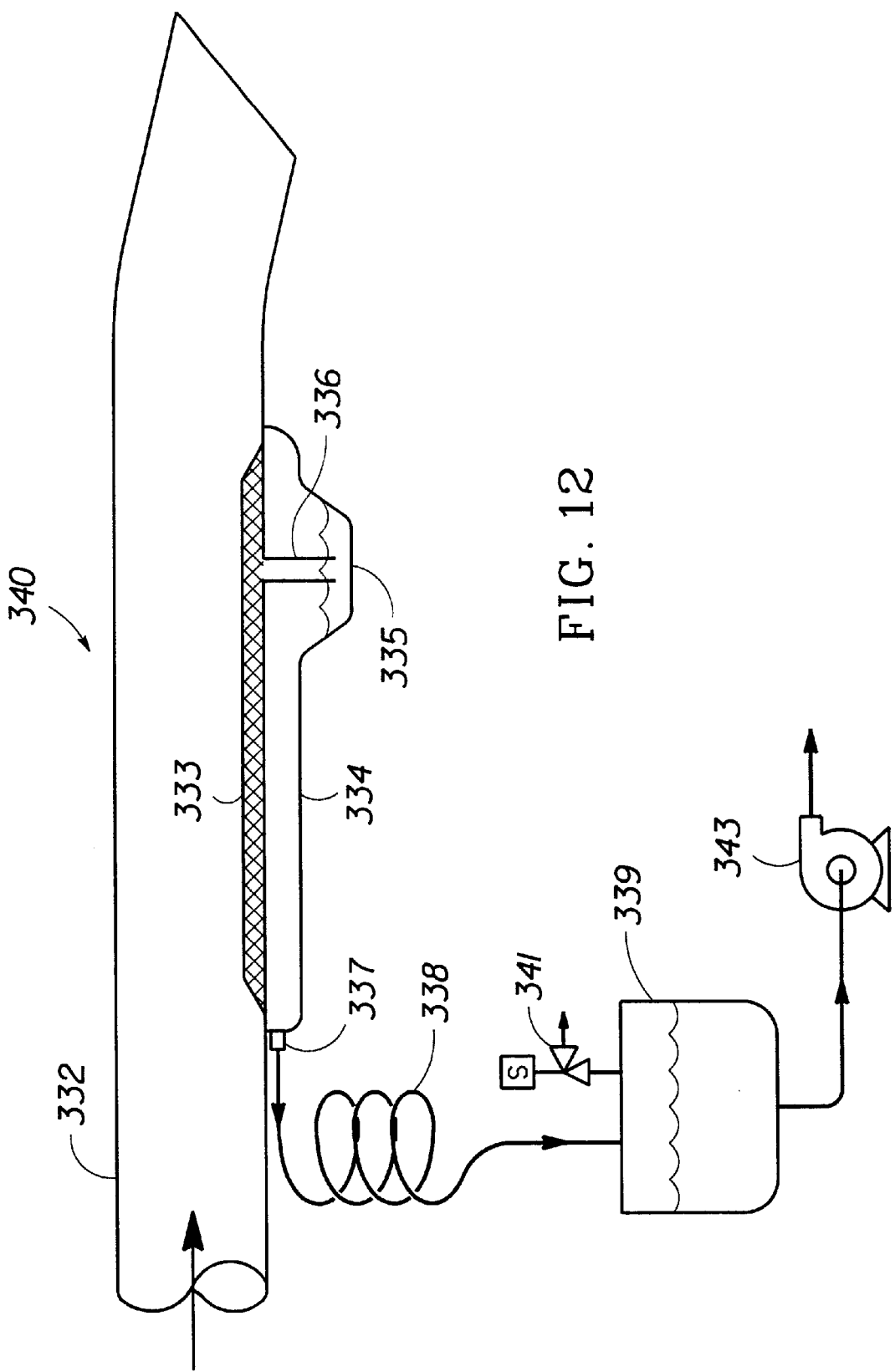
FIG. 12 is a schematic diagram of a liquid water recovery system capable of revaporizing the liquid water.

FIG. 12 is one embodiment of an engine exhaust water recovery system 340 that operates only once per vehicle start. This embodiment condenses water from the engine exhaust gas stream while the engine and exhaust system are cold and subsequently utilizes the hot exhaust system to evaporate and purify the condensate. In this embodiment, the primary exhaust pipe 332 is fitted with a member 333 to reduce the velocity of the portion of the exhaust gas nearest the sidewalls to prevent the condensed water from being carried completely out of the exhaust system by the high exhaust gas flow velocity. This condensate is allowed to run into a collection reservoir 334, 335 through a conduit 336. While not shown in this embodiment, the system may also be fitted with ambient coolers or liquid cooled heat exchangers as described previously. Water accumulation takes place so that a significant portion of the liquid water that normally drips from the tail pipe of a cold exhaust system is recovered into the reservoir 334, 335.

Furthermore, the recovered liquid water is distilled in the recovery system when the primary exhaust pipe gets hot after extended engine operation, thereby providing a first stage of water purification. During operation of the engine, the exhaust pipe 332 will reach normal operating temperature and the system may be designed such that the housing of the reservoir 334 approaches or exceeds the boiling temperature of water and the water within the reservoir 334 is evaporated. This water vapor may leave the reservoir 334 through a discharge port 337 and associated conduit 338. Since the conduit 338 contains primarily water vapor, the water vapor is readily condensed since the heat load of the exhaust has been eliminated from the condensing system. This condensed water is collected in a reservoir 339 and transferred by a lift pump 343 to its ultimate storage reservoir. If desired, the water reservoir 334 may be designed with a well 335 that is thermally isolated such that it remains near ambient temperature, preventing the evaporation of all the water in the well and forming a water seal around conduit 336. This prevents exhaust gas from passing through the condenser 338 and into the reservoir 339. Alternatively, a small and well controlled vent 341 may be provided to allow a controlled amount of exhaust gas to be cooled in the condenser 338 and aid in the movement of water vapor from the reservoir 334, through the condenser 338 and into the water reservoir 339.

Figure 13:
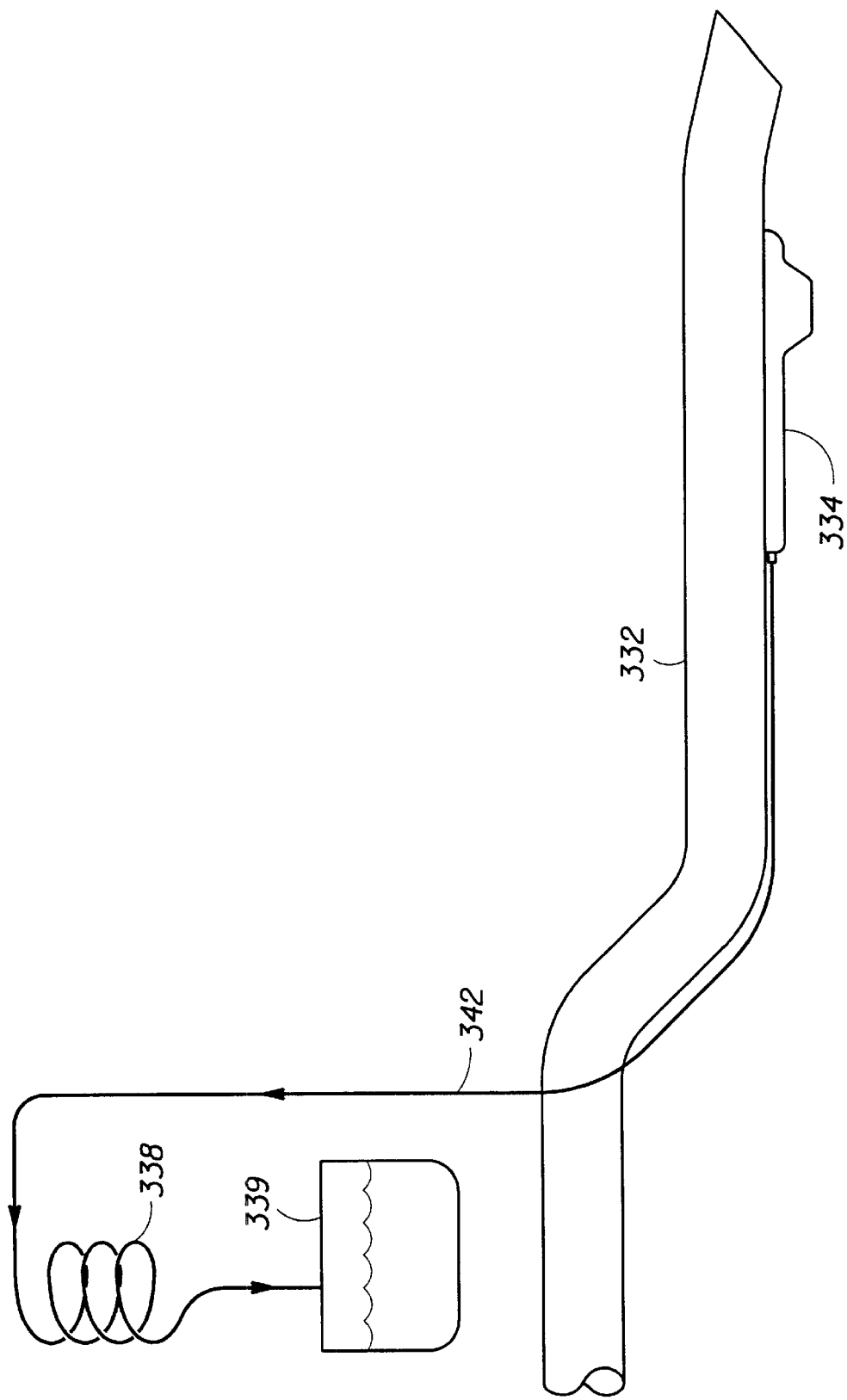
FIG. 13 is a schematic diagram of a water vapor transfer line in thermal communication with the exhaust pipe to allow water vapor to be carried to a point higher in the vehicle than the exhaust system.

In an alternate embodiment as shown in FIG. 13, the placement of the condenser 338 and the degree of thermal contact between the exhaust pipe 332 and the water vapor transfer line 342 allows water vapor to be carried to a point higher in the vehicle than the exhaust system. In this manner, water vapor may be delivered to the engine compartment where it may be condensed and stored at a point above that at which it is consumed. This method of water condensate recovery may be designed to operate in a completely passive manner since it would eliminate the water transfer pump necessary to lift the condensate from a sump under the vehicle to a reservoir in the engine compartment.

It should be recognized that the condenser described above could be used to provide water for any one or more applications on present or future automobiles that rely upon a source of water. Specifically, the water could supply one or more electrolyzers and the windshield wiper reservoir.

While the foregoing is directed to the preferred embodiment of the present invention, other and further embodiments of the invention may be devised without departing from the basic scope thereof, and the scope thereof is determined by the claims which follow.

What is claimed is:

1. A method for supplying liquid water to an electrolyzer onboard an automobile having an engine and an engine exhaust gas system comprising the steps of:
    (a) cooling a condensing region of the exhaust gas system;
    (b) passing exhaust gas from the engine through the condensing region, wherein the exhaust gas contains water vapor;
    (c) transferring heat from the exhaust gas to the condensing region;
    (d) condensing the water vapor from the exhaust gas in the condensing region to form liquid water; and
    (e) delivering the liquid water to the device.

2. The method of claim 1, further comprising the step of:
    (f) filtering and purifying the liquid water.

3. The method of claim 1, wherein the step of condensing water vapor is performed during a cold start event of the engine.

4. The method of claim 3, wherein the automobile further comprises an engine coolant system, and further comprising determining the beginning of the cold start event of the engine by satisfying one or more engine ignition initiating conditions selected from the group consisting of:
    (i) the cooling fluid temperature in the engine coolant system is below a temperature setpoint;
    (ii) the amount of time elapsed since the engine was previously operated exceeds a time setpoint;
    (iii) the temperature difference between the exhaust gas and the radiator cooling fluid exceeds a differential temperature setpoint;
    (iv) the engine block temperature is below a temperature setpoint; and
    (v) combinations thereof.

5. The method of claim 3, wherein the automobile further comprises an engine coolant system, and further comprising determining the ending of the cold start event of the engine by satisfying one or more stop conditions selected from the group consisting of:
    (i) the cooling fluid temperature in the engine coolant system exceeds a temperature setpoint;
    (ii) the amount of time elapsed since the beginning of the cold start event exceeds a time setpoint;
    (iii) the temperature difference between the exhaust gas and the cooling fluid in the engine coolant system is less than a differential temperature setpoint;
    (iv) a reservoir receiving the liquid water is full;
    (v) the engine block temperature exceeds a temperature setpoint; and
    (v) combinations thereof.

6. The method of claim 1, wherein the condensing region is a conduit supplied with a slip stream of exhaust gas in parallel fluid communication with the exhaust gas system.

7. The method of claim 6, wherein the step of cooling is performed continuously.

8. The method of claim 6, wherein the conduit has a diameter less than half the diameter of the exhaust pipe.

9. The method of claim 6, wherein the conduit has external cooling fins.

10. The method of claim 6, wherein the conduit is in thermal communication with cooling fluid circulated from an engine coolant system.

11. The method of claim 6, further comprising:
    circulating cooling fluid from the engine coolant system into thermal communication with the conduit during a period following the cold start event of the engine.

12. The method of claim 1, wherein the device includes a reservoir.

13. The method of claim 1, wherein the device is an electrolyzer, windshield washer fluid reservoir, or combinations thereof.

14. The method of claim 1, further comprising:
    communicating the liquid water away from the exhaust gas stream;
    heating the liquid water to form a water vapor stream; and
    recondensing the water vapor stream to form liquid water.

15. The method of claim 14, wherein the recondensed liquid water is substantially free of nonvolatile contaminants.

16. The method of claim 14, wherein the liquid water is recondensed at an elevated position within the vehicle.

17. The method of claim 16, further comprising gravity feeding the recondensed liquid water to the device.

18. The method of claim 6, wherein the automobile further comprises an air conditioning system having a cooling coil in thermal communication with the slip stream.

19. The method of claim 1, wherein the condensing region has a gas flow velocity reducing member.

20. The method of claim 6, wherein the condensing region of the conduit is elevated above the device.

21. The method of claim 4, further comprising a cooling fluid flow loop from the engine coolant system having a flow control valve that opens at the beginning of the cold start event.

22. The method of claim 5, further comprising a cooling fluid flow loop from the engine coolant system having a flow control valve that closes at the end of the cold start event.

23. The method of claim 21, wherein the flow control valve is a thermostatic expansion valve.

24. The method of claim 22, wherein the flow control valve is a thermostatic expansion valve.

25. A method for supplying liquid water to an electrolyzer onboard an automobile having an air conditioning cooling coil, comprising the steps of:

(a) passing air containing water vapor into thermal communication with the cooling coil;
(b) condensing the water vapor from the air on the cooling coil to form liquid water; and
(c) delivering the liquid water to the device.

26. The method of claim 25, wherein the air is provided by a source selected from the group consisting of the automobile cabin compartment, the engine compartment, and combinations thereof.

* * * * *